April 23, 1963 H. L. DANIELS 3,087,026

BOUNDARY DISPLACEMENT MAGNETIC RECORDING APPARATUS

Filed Sept. 17, 1952 6 Sheets-Sheet 1

INVENTOR

HOWARD L. DANIELS

BY Cushman, Darby & Cushman

ATTORNEYS

April 23, 1963 H. L. DANIELS 3,087,026

BOUNDARY DISPLACEMENT MAGNETIC RECORDING APPARATUS

Filed Sept. 17, 1952 6 Sheets-Sheet 2

INVENTOR

HOWARD L. DANIELS

BY Cushman, Darby + Cushman

ATTORNEYS

INVENTOR

HOWARD L. DANIELS

BY Cushman, Darby & Cushman

ATTORNEYS

BOUNDARY DISPLACEMENT MAGNETIC RECORDING APPARATUS

Filed Sept. 17, 1952 6 Sheets-Sheet 4

INVENTOR
HOWARD L. DANIELS
BY Cushman, Darby & Cushman
ATTORNEYS

April 23, 1963 H. L. DANIELS 3,087,026

BOUNDARY DISPLACEMENT MAGNETIC RECORDING APPARATUS

Filed Sept. 17, 1952 6 Sheets-Sheet 5

INVENTOR
HOWARD L. DANIELS

BY Cushman, Darby & Cushman

ATTORNEYS

BOUNDARY DISPLACEMENT MAGNETIC RECORDING APPARATUS

Filed Sept. 17, 1952 6 Sheets-Sheet 6

INVENTOR

HOWARD L. DANIELS

BY Cushman, Darby & Cushman

ATTORNEYS

United States Patent Office 3,087,026 Patented Apr. 23, 1963

3,087,026

BOUNDARY DISPLACEMENT MAGNETIC RECORDING APPARATUS

Howard L. Daniels, St. Paul, Minn., assignor, by mesne assignments, to Sperry Rand Corporation, New York, N.Y., a corporation of Delaware Filed Sept. 17, 1952, Ser. No. 310,070
26 Claims. (Cl. 179—100.2)

This invention pertains to magnetic recording and particularly to methods and apparatus for inducing patterns of intelligence magnetization upon a magnetizable record medium.

In United States patent application Serial No. 132,732, filed December 13, 1949 by H. L. Daniels et al., now Patent No. 2,743,320, there is described and claimed methods and apparatus for recording magnetic flux patterns on a magnetizable member which is adapted to be moved relative to electromagnetic transducing apparatus. That method and apparatus involves the application of different states of magnetization either side of a boundary formed between these areas of differing magnetization, the boundary being caused to be displaced along the member in response to intelligence to be recorded. Playback may then be effected by detecting the excursions of the boundary by a suitable pick-up device, which in one form may be a conventional electromagnetic reading unit for use with magnetic tape. The boundary may be caused to be displaced either by physical movement of the magnetizing device, or there may be employed a stationary device in which the magnetic flux pattern is shifted electrically without requirement for physical movement. The boundary may be "projected" or moved completely off the tape. Techniques are also disclosed and claimed in the above patent for making such records visible by applying finely divided magnetic material to the record whereby the boundary is outlined by reason of a considerable amount of the magnetic material being attracted to the boundary region. In this way a magnetic recording may serve the usual purposes and also some of the functions of oscilloscope traces and so forth.

The invention described in the present application constitutes improvements upon the boundary displacement recording techniques disclosed in the above-mentioned application. More specifically, the present invention relates to methods for making improved boundary recordings, including improved properties for making the record visible, and the invention also relates to improved transducing apparatus which constitute ways of carrying out the improved methods.

One important aspect of the present invention involves the use of transducing heads for boundary recording, which heads are characterized by a pole piece of relatively low reluctance at the "downstream" side of the recording gap. Another important aspect of the present invention involves the establishment of a first flux relative to the magnetizable surface, this flux tending to establish a pattern of discrete areas of retained magnetization on the surface. The general criteria of these flux areas where recorded on the surface is that finely divided magnetizable material if sprinkled on the member or otherwise applied in a distributed pattern will be attracted to and clearly designate the flux areas. In addition to the first flux, additional flux for boundary recording as described in the above mentioned patent is established in relation to the magnetizable surface in such fashion as to tend to either substantially prevent (in some operations) or erase (in other operations) all of the above mentioned discrete flux areas except those lying within the boundary region. As a result improved records are obtained, and, furthermore, finely divided magnetic material later applied to the record will be strongly attracted not only to the boundary in general as originally described in application Serial No. 132,732 but even more so to the now subdivided magnetic areas which were established in the first step. It has been found that the greater flux transitions associated with the discrete areas attract and concentrate the ferromagnetic particles better than the boundary alone. According to the invention, the first flux may precede the additional flux or the two may be applied simultaneously. Both types of operation will become more clear as this description proceeds.

The novel electromagnetic transducing devices according to the last above described aspect of this invention are chiefly characterized by the provision of one pole structure of laminated arrangement positioned to cause a plurality of transverse recordings in bands or tracks in the direction of movement of the surface relative to the transducer. A second pole structure is then provided having a portion in close proximity to a portion of the first pole structure to form a recording gap therebetween, the two pole structures being further positioned so that the magnetizable surface will run closely adjacent thereto or between the poles, thus permitting magnetic recording in the usual sense. Both thickness and surface recording is possible.

The cooperation of the second pole structure with the first is such that a recording flux in the absence of an intelligence signal is most intense at one extreme of the gap, is equally intense at the opposite extreme of the gap but in the opposite direction, and the two opposite fluxes diminish in a predetermined manner to a flux reversing point at the central portion of the gap. Thus, with no intelligence signal applied, the boundary will be applied to the magnetizable surface at a point midway between the extremes of the recording gap. However, as intelligence signals are applied, the boundary will be caused to shift laterally along the gap from one end thereof to the other, to so shift the boundary.

It is, therefore, a primary object of this invention to provide methods and apparatus for improved boundary-type magnetic recordings.

It is a further object of this invention to provide methods and apparatus for providing improved magnetic boundary recording in which the recording may be rendered visible in improved fashion.

It is a further object of this invention to provide improved electromagnetic transducing devices for either contact or non-contact magnetic recording and wherein a relatively low signal input is required.

It is a further object of this invention to provide an electromagnetic transducing device including a high reluctance pole structure and a low reluctance pole structure which cooperate to produce maximum playback signals in a boundary displacement recording system.

It is a further object to provide a boundary displacement recording which may readily yield a high degree of linearity in both contact and non-contact application.

It is a further object to provide a boundary recording having the discrete flux areas in existence in the boundary region.

It is a further object of the invention to provide for multiple boundary recordings.

Further objects and advantages and the entire scope of the invention will become more fully apparent from the following detailed description of exemplary embodiments of the invention and from the appended claims. It will be understood that the exemplary embodiments are described for purposes of illustration and no limitation thereto is intended.

This application is a continuation-in-part of my application Serial No. 274,288, filed February 29, 1952, now abandoned.

The invention may be best understood with reference to the accompanying drawings in which:

FIGURE 1 is a diagrammatic elevational view of a magnetic transducer according to the invention.

FIGURE 1*a* is a graphical representation of flux distribution in the device shown in FIGURE 1.

Figures 1, 2:
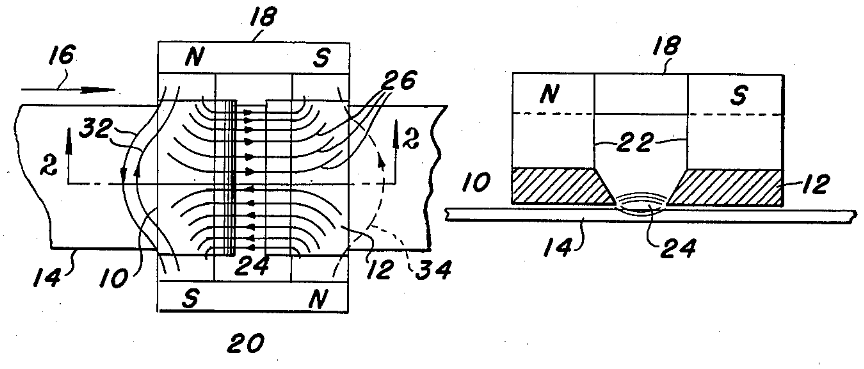
FIGURE 2 is a cross-sectional view of the device of FIGURE 1 taken along the line 2—2 of FIGURE 1.
Figure 6:
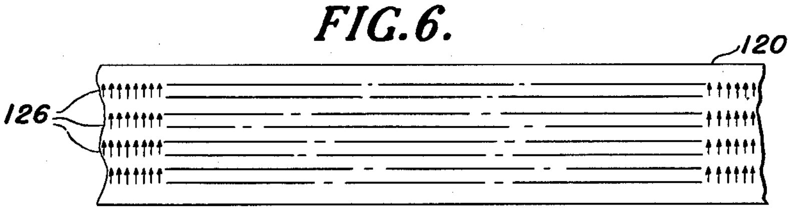
Figure 6A:
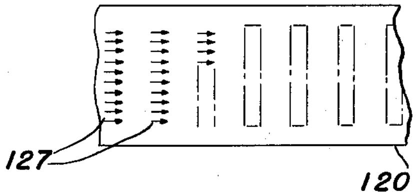
Figure 6B:
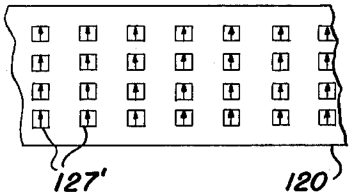

FIGURES 6, 6*a* and 6*b* represent sections of magnetic tape after passing the leading edge of the gap in FIGURE 1.

Figures 7, 8:
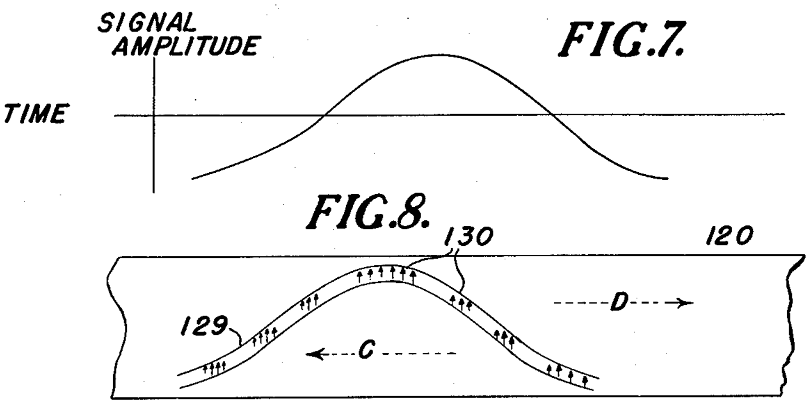

FIGURE 7 is a graph of a representative signal impressed upon the device of FIGURE 1.

FIGURE 8 shows the tape of FIGURE 2 after the recording process is completed.

Figure 8A:
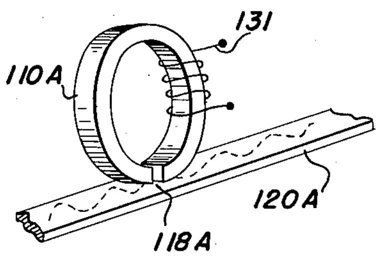

FIGURE 8*a* shows a head suitable for reading the record produced by this invention.

Figure 9:
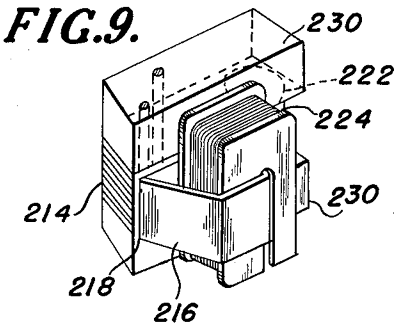

FIGURE 9 is a perspective view of an alternative recording transducer according to the invention.

Figure 10:
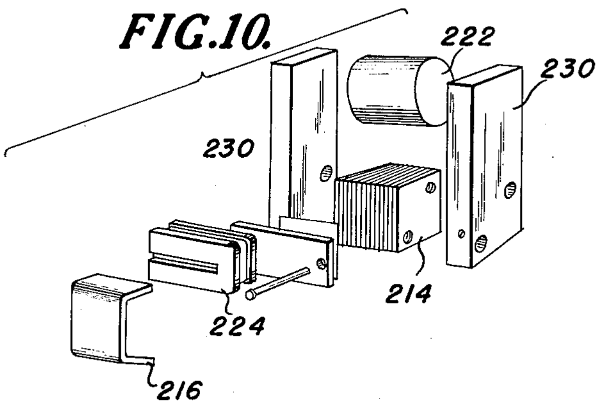

FIGURE 10 is an exploded view of the structure of FIGURE 9.

Figure 11:
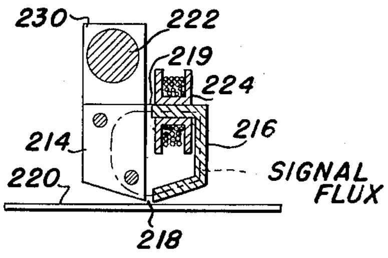

FIGURE 11 is a sectional side view of the structure of FIGURE 9.

Figure 12:
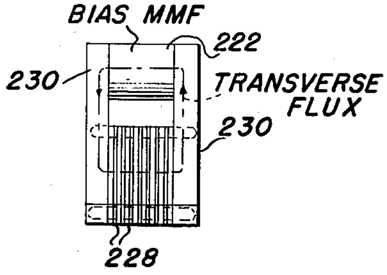

FIGURE 12 is an end view of the structure of FIGURE 9.

Figure 13:
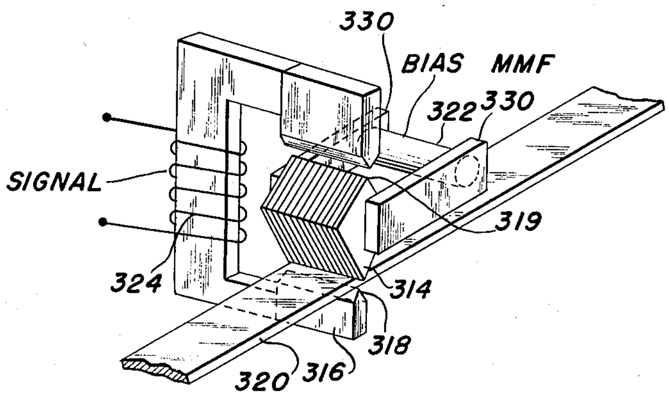

FIGURE 13 shows still another embodiment of the invention.

Figures 14, 15, 16:
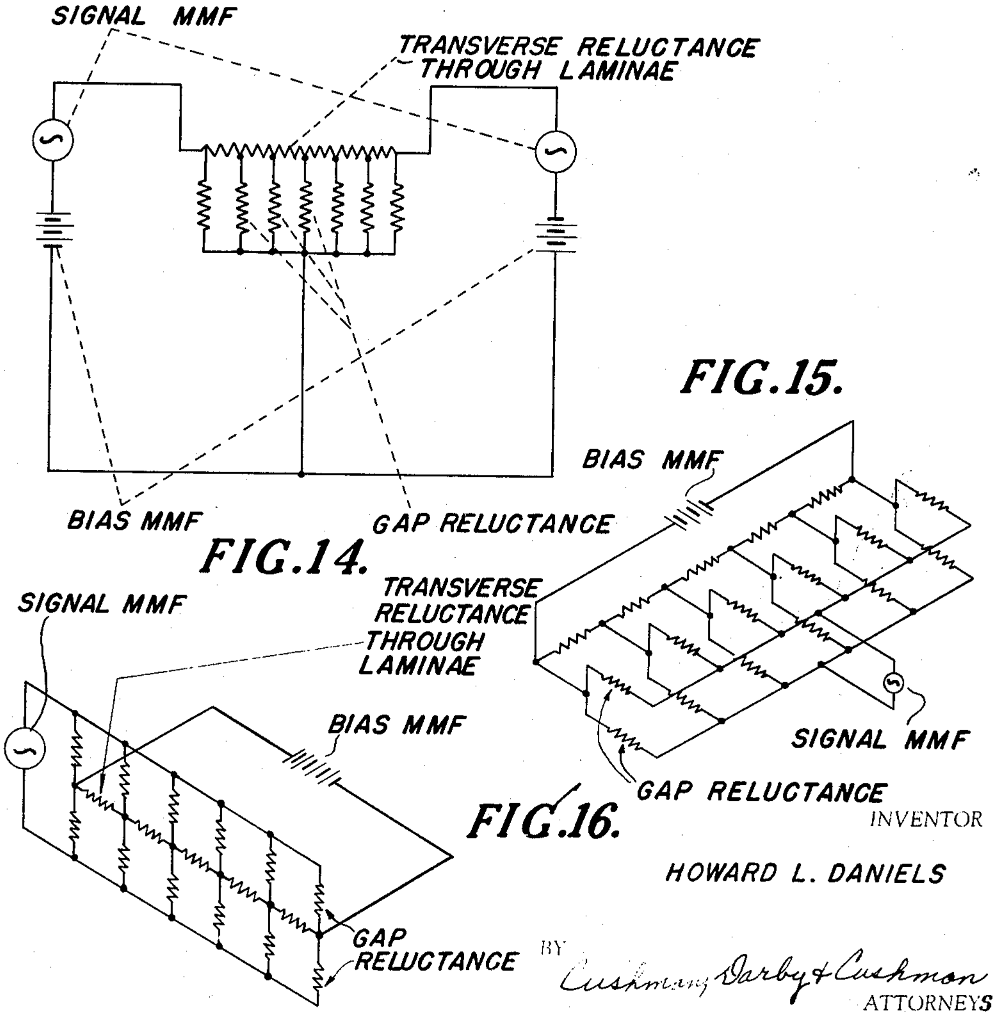

FIGURE 14 exhibits the electrical analogue of the device of FIGURE 1.

Figure 5:
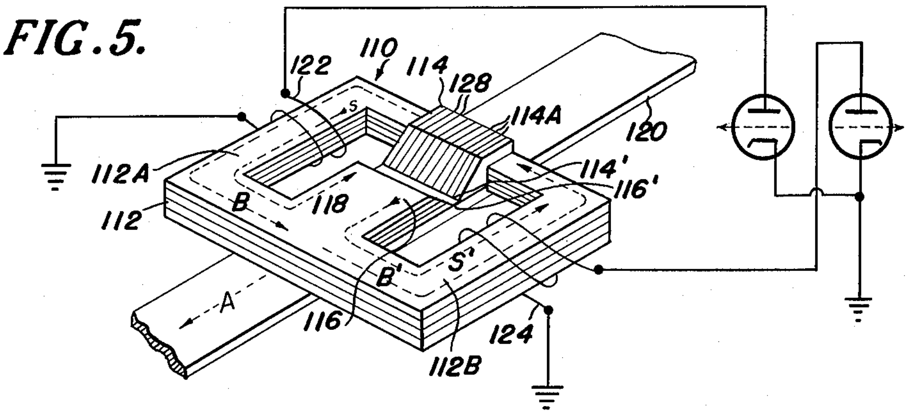
FIGURE 5 shows an exemplary embodiment according to the invention of a recording transducer.

FIGURE 15 exhibits the electrical analogue of the device of FIGURE 5.

FIGURE 16 exhibits the electrical analogue of the device of FIGURE 9.

Figure 17:
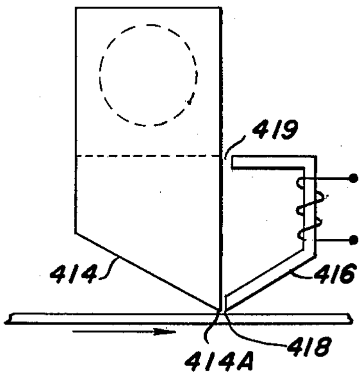
Figure 19:
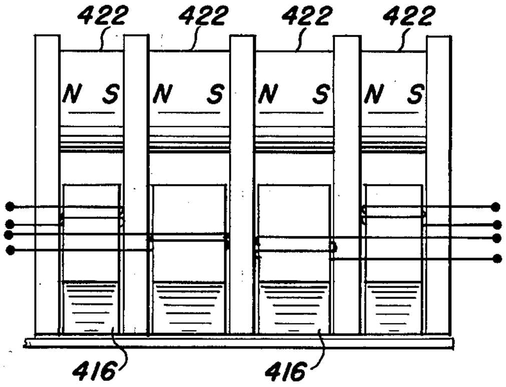
Figure 18:
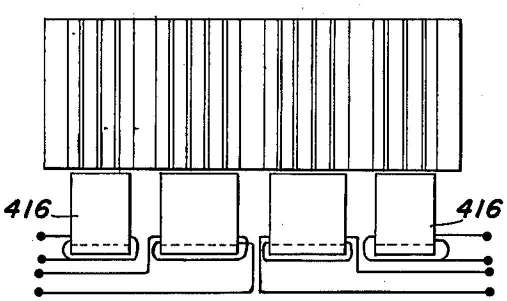

FIGURES 17–19 show a still further embodiment of the invention.

Figure 20:
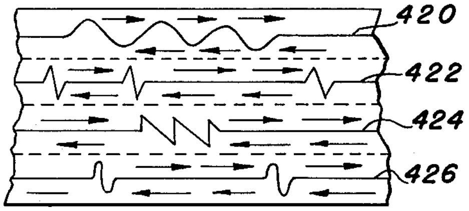

FIGURE 20 shows a recording derived by use of the embodiment of FIGURES 17–19.

Figure 24:
Figure 25:
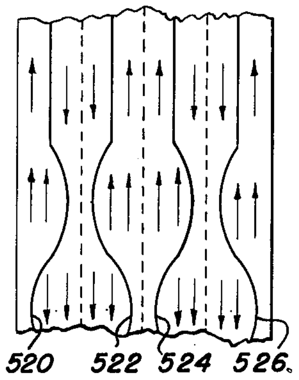

FIGURES 21–24 show yet another embodiment utilizing principles of the invention, and FIGURE 25 shows a recording derived by use of the device of FIGURES 21–24.

The following description will proceed in connection with magnetizable tape. However, it will be immediately apparent to those skilled in the art that the invention applies equally to magnetizable members in the form of disks, endless belts or drums. In fact, magnetizable drums are frequently constructed by simply wrapping magnetic tape thereabout.

Embodiments of transducing heads according to the present invention will first be described, and the method aspects of the invention will in part be apparent and in part described below.

As above stated, one basic improvement of this invention has to do with the interrelationship of reluctances of two pole pieces employed in surface recording, as for example, in the invention described in the patent above cited. Basically, it has been discovered that the pole piece which is "upstream" or toward the advancing tape may be of relatively high transverse reluctance for forcing the flux across the recording gap, while the pole piece at the "downstream" side should be of relatively low reluctance. A primary reason for having the downstream pole piece of low reluctance is to reduce the tendency of flux to fringe transversely along the surfaces of the pole piece adjacent the tape. Such stray flux tends to introduce additional remanent flux at right angles to the desired direction of recorded flux, which flux may partially erase the recorded signals.

Figure 1A:
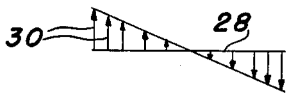

This phase of the invention may be best understood with reference to FIGURES 1 and 2, which are diagrammatic showings with the recording gap greatly exaggerated and enlarged. In these figures a first or upstream pole piece 10 and a second or downstream pole piece 12 are illustrated in position to cooperate with tape 14 movable in the direction of arrow 16. Sources of magnetomotive force (hereinafter M.M.F.), which may be permanent magnets or magnetically permeable material having a coil thereon, are provided at 18 and 20 for causing flux to flow through portions of the pole pieces and across the gap as described in the above mentioned patent. In more detail, the M.M.F. sources 18 and 20 are positioned somewhat above the tape to avoid flux linkage directly therethrough and a flux path is through magnetically permeable legs 22 of low reluctance to the ends of the respective pole pieces 10 and 12. As indicated by legend in FIGURES 1 and 2 the magnetomotive force source 18 may be arranged with a given north to south orientation and the source 20 with the opposite orientation. Accordingly, due to the reluctance of pole pieces 10 and 12, the magnetic flux developed by sources 18 and 20 will fringe or loop across the gap 24 according to the arrows 26. The flux will be most concentrated near the ends of the gap 24 and will decrease the intensity to a reversal point near the center of the gap. That is, the reversal point will be at the center of the gap in the absence of applied M.M.F.'s to shift the reversal point, as for example, in the above mentioned patent. The decreasing concentration and reversal of flux is diagrammatically illustrated in FIGURE 1 by the arrangement of arrows 26 to be crowded near the ends of the gap with increasing spacing between the arrows toward the center of the gap. The distribution of magnetomotive force is further diagrammatically illustrated in FIGURE 1*a* where the line 28 represents the length of the gap and the arrows 30 represent the flux disposition, the longer arrows indicating the more concentrated flux.

It has been discovered that the upstream pole piece 10 may be of relatively high transverse reluctance to force the flux to fringe across the gap 24 according to the arrows 26, but this may be in combination with a downstream pole piece 12 of relatively low reluctance. Flux will attempt to fringe or leak along the other exterior surfaces of the pole piece 10 according to the arrows 32, and will tend to produce surface recording in the widthwise direction of the tape. This flux will also have vectors in the direction longitudinal with the tape in the region where said flux enters and leaves the pole piece. In general, it may be stated that for most purposes the remanent magnetization introduced into the tape 14 by flux along the arrows 32 will not impair the quality of the recording since the remanent magnetization resulting from flux at arrows 26 will override the previous magnetization satisfactorily.

However, where the downstream pole piece 12 is purposely made of relatively low reluctance, there will be only a minimum amount of lengthwise fringing in the region of the dash line 34. In other words, if the recording has been made at the gap 24, the fact that the pole piece 12 is of relatively low reluctance will prevent objectionable extraneous fringing flux along the pole piece 12 and there will be no diminution of the remanent magnetization as created by the gap 24.

Figure 3:
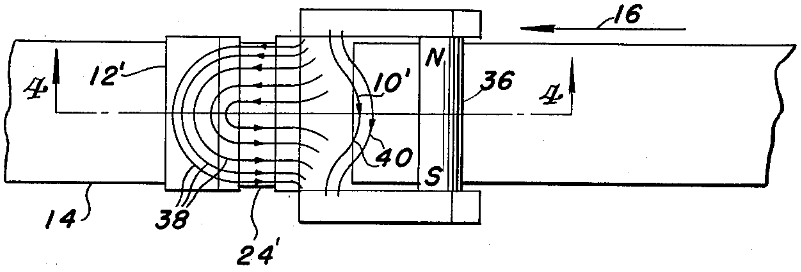
FIGURE 3 shows a diagrammatic elevational view of another embodiment of the invention.
Figure 4:
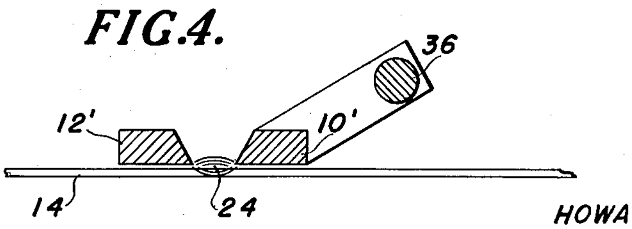
FIGURE 4 shows a sectional view taken substantially along the line 4—4 of FIGURE 3.

In FIGURES 3 and 4 there is illustrated another embodiment of a recording transducer for producing boundary recording and utilizing a pole piece of relatively high reluctance in the upstream position and a pole piece of relatively low reluctance in the downstream position. Again the tape is designated 14 and moves in the direction of arrow 16. The upstream pole piece is designated 10′ and the downstream 12′. According to the present invention the pole piece 10′ is to be of higher transverse reluctance than pole piece 12'. In this embodiment the source of M.M.F. here designated 36 is applied across only the upstream or high reluctance pole piece 10'. The pole piece 12' is to be maintained in position by suitable means (not shown) separate from the magnetic circuit established by source 36 and pole piece 10'. As represented by arrows 38 in FIGURE 3, the flux produced by source 36 will thread across the gap 24' in the manner shown. It will apparent to those skilled in the art that a portion of the flux will tend to fringe across the gap 24 and travel through the low reluctance pole piece 12' rather than pass through the high reluctance pole piece 10'. Additionally, as again shown by the spacing of the arrows 38, the highest concentration of flux will be near the ends of gap 24 with a decreasing amount of flux threading a considerable distance through pole piece 10' before fringing across gap 24 and into the pole piece 12'. In connection with this embodiment, means will be explained more fully below for causing shifting of the boundary in accordance with applied signals.

As will be explained more fully in connection with an embodiment of the invention about to be described, the high reluctance characteristic may be introduced into pole pieces 10 and 10' either by constructing these pole pieces of homogeneous material of high magnetic reluctance or by constructing these pole pieces of laminae of even relatively low magnetic reluctance, but stacked so that each lamina lies in a plane perpendicular to the plane of the tape.

In the embodiment of FIGURES 3 and 4, as in the embodiment of FIGURES 1 and 2, flux would tend to fringe along the surfaces of pole piece 10', as indicated in FIGURE 3 by the arrows 40, except that pole piece 10 is of low reluctance. Any small amount which would so fringe will not be objectionable.

Further embodiments of the invention will now be described, these embodiments comprising the high-low reluctance feature and also presenting further aspects of the invention.

Referring to FIGURE 5, according to one exemplary embodiment of the invention an electromagnetic transducing head represented generally as 110 comprises a core 112 of magnetic material provided with a first pole structure 114 and a second pole structure 116, the pole structures having portions 114' and 116' in close proximity to each other to form a gap 118 past which the magnetizable medium 120 may be moved. The position of the gap 118 relative to the medium may be in all respects conventional so that fringing flux across the gap will create areas of magnetization on the medium 120.

The first pole structure 114 is made up of a stack of laminae **114*a* in planes perpendicular to the surface of the magnetizable medium 120, with the axis of the stack running transverse to the direction of the medium 120. The direction of movement of the medium is indicated by the arrow A in FIGURE 1. The stack of laminae 114*a* making up the first pole structure 114 is designed to have a relatively high reluctance in the direction of the stack, that is, transverse to the direction of movement of the magnetizable medium 120. Thus, there will be considerable opposition to magnetic flux attempting to thread the pole structure 114 in the direction normal to the laminae 114*a*. As a result, as will be more fully explained below, when an effort is thus made to establish flux through the stack in the direction of its axis, flux will fringe outwardly between each laminae about the contour thereof. Accordingly, where the laminations are closely adjacent the magnetizable medium 120, as near the gap 118, transverse magnetization will be established in a plurality of bands or tracks along the medium 120 in the direction of movement A. Brass or other non-magnetic spacers 128** may be placed between the laminae to enhance the fringing action.

As an alternative practice, the first pole piece 114 may be a homogeneous piece of magnetic material of relatively high reluctance, as has been described above in connection with FIGURES 1–4.

The magnetic path 112, including the second pole structure 116, may be either a homogeneous piece of magnetic material or may be constructed of laminae stacked in planes parallel to the surface of the magnetizable medium 120.

Each magnetic lamina in elements 112, 114 and 116 is preferably composed of a highly permeable material as for example one of the alloys known as "Mumetal," or "Permalloy" or alternatively one of the various grades of silicon steel.

A magnetizing coil 122 may be wound about a first portion **112*a* of the magnetic core 12 and an identical coil 124 wound about the other portion of the core, this portion being designated 112*b*. Current may now be applied in equal amounts (or at least to produce equal ampere-turns) through both of the coils 122 and 124 in directions tending to establish a flux along the arrows B, B'. That is, the currents may be "aiding" in this respect. A variable signal current which is intended to cause displacement of the boundary may also be applied to each coil 122, 124** in "push-pull" fashion. As will be understood by those skilled in the art, under this type of operation the direction of the current in each coil will remain the same, but the magnitude in one coil will decrease, and the other increase, and vice versa. Push-pull operation for the boundary recording is shown in detail in the above-mentioned patent.

As will be noted in FIGURE 5, the first pole structure 114 protrudes inwardly of the magnetic core 112, and may be sloped inwardly toward the surface of magnetizable medium 120 to the portion 114' which defines one edge of the recording gap 118. The second pole structure 116 is correspondingly directed inward of the magnetic ring 112 and also may be sloped inwardly and downwardly toward the medium 120 to the portion 116' which defines the opposite edge of the recording gap 118. The sloping of the poles is not necessary, but aids in concentrating the flux at gap 118 adjacent medium 120. While in FIGURE 5 the lower surfaces of both pole structures 114 and 116 lie in a plane parallel to the surface of the medium 120 and closely adjacent thereto, as will become apparent below, the main requirement is that only the portions 114' and 116' be in close proximity to the tape and the remaining portions of the pole structure may lead away from the magnetizable medium 120.

Assuming for the moment that equal currents exist in the coils 122 and 124, as the medium 120 is moved relative to the transducer 110 in the direction A, the pole structure 114 serves to highly magnetize the medium 120 with the magnetization running transversely of the medium in a series of parallel bands or tracks 126 (FIGURE 6) which extend along the direction of motion of the medium. As stated above, this parallel band configuration of magnetization on the medium 120 results from the effective gaps across spacers 128 which lie between the laminae of pole structure 114. It will be understood that while the gaps extend completely about the pole structure 114, it is the portions of the gap in close proximity to the medium 120 which effect the magnetization. These gaps absorb most of the magnetomotive potential drop in the magnetic path 112 as established by the coils 122 and 124, thereby establishing what may be termed a bias field.

When the pole piece 114 is a homogeneous piece of high reluctance magnetic metal the M.M.F. applied across the length thereof (corresponding to the stacked direction) will result in flux fringing generally over all the surfaces thereof. Some of this flux will fringe to the pole piece 116 in distributed manner as shown in FIGURES 1–2. However, some will also fringe through the tape 20 and provide transverse recordings in the tape. If a homogenous pole piece 114 is used, the transverse field is in this case uniform and free from discontinuities.

After passing under the pole structure 114, the magnetizable medium 120 next encounters the recording gap 118. Due to the construction of the transducer 110 as above described, a portion of the flux tends to leak across gap 118 in the distributed manner of FIGURE 1*a*, the reluctances of the pole structure 114 and the path 112 being designed so as to produce this leakage intentionally. As will be understandable from the structure shown in FIGURE 5, which is analogous to the structure of FIGURE 1, the leakage flux tends to cross the left side of the gap as viewed in this figure and thread around the magnetic path 112 in a direction S conforming to the arrow B. Leakage flux also crosses the right side of the gap but in the opposite direction S′. Thus the leakage magnetomotive forces at opposite ends of the gap 118 are equally and oppositely directed. Since leakage flux from the magnetic path 112 must also flow as above stated through the laminated pole structure 114, it follows that the leakage will be greatest at the outermost laminae and will decrease progressively toward the inner laminae, reaching zero at the geometrical center of the length of the gap 118 (still assuming equal ampere-turns at coils 122 and 124). Thus, at the center of the gap 118, there will exist the narrow line or region at which flux of neither sense is present, this region being termed the boundary.

As signal current is applied, as by increasing the current in coil 122 and decreasing the current in coil 124 or vice versa, the leakage flux paths designated by arrows S and S′ will tend to increase at one end of the gap and to decrease at the other, thus causing the boundary region to be displaced, as has been fully described in the above mentioned patent.

Due to the just described conditions at the gap 118, the resultant flux across the gap will be such as to induce in a longitudinal direction parallel to the direction of movement A of medium 120, conditions of magnetization (preferably but not necessarily saturation) but of opposite polarity on opposite sides of the boundary region which is the dividing line between the oppositely saturated areas. As a result, the pre-recorded parallel band pattern comprising bands 126 is erased to an extent depending on the degree of saturation in all areas of the tape except the boundary region, the magnetomotive force across gap 118 in the boundary region not being sufficiently intense to overcome the transverse magnetization previously induced by pole structure 114.

When a signal such as that displayed in FIGURE 7 is impressed in the push-pull manner upon coils 122 and 124, the effect will be to shift the distribution of M.M.F. across the gap 118 as above described to displace the boundary region in proportion to the impressed signal. Thus, the boundary will assume a configuration substantially as shown in FIGURE 8. In this figure, the boundary region designated 129 is shown to separate oppositely saturated areas whose respective polarities are indicated by C and D, and the remanent (unerased) portions of the prerecorded parallel band areas in the boundary region 29 are denoted by reference character 130. Thus, numerous small areas of magnetic transition, serving to trace major areas of oppositely polarized magnetic saturation, appear displaced transversely from the center line of a tape or the like by an amount proportioned to the instantaneous signal intensity.

An understanding of the exemplary embodiments of the invention above described indicates a basic method concept of the present invention. That is, by the present invention a new method of magnetic recording is set forth, in which a plurality of discrete magnetized areas such as the bands 126, are first established on the magnetizable medium, and such areas are subsequently overwritten except in the shifting boundary area. One primary virtue of providing discrete magnetized areas is that finely divided magnetic recording material when dusted or otherwise distributed over the surface will be strongly attracted to the areas of transition.

It will be immediately apparent that the scope of the present method invention embraces having the tape prerecorded at any prior time with the discrete magnetized areas and later magnetic boundary recording may be effected by the use of boundary recording heads such as described in the above-mentioned Daniels patent. Moreover, as will appear more fully below both recording steps may occur simultaneously.

It will be further apparent that in place of continuous bands 126 in the direction of movement of the medium 120, other convenient types of discrete magnetized areas may be established, all for the purpose of providing small regions of strong magnetic transition which will serve to attract magnetic material and perform the other functions inherent thereto after the boundary recording has been accomplished As in FIGURE 6*a*, the bands 126 of FIGURE 6 could be replaced with transverse bars 127 of longitudinal recording or as in FIGURE 6*b*, there may be a great number of small "pulses" 127′.

It will be understood that the pole piece 114 in FIGURE 5 may be homogeneous rather than laminated, and in such case the discrete bands 126 will not be recorded. However, there will be some generally transverse recording in the boundary not erased by the major recording flux across gap 118, and this may be of some advantage in causing flux change lines which will strongly attract visible magnetic particles.

As is set out in full in the above-mentioned Daniels et al. patent, the boundary-displacement recording of the above type may be read by the conventional type of pick-up transducer, the gap of which spans the entire range of displacement of the boundary or at least a considerable portion thereof, there being some cases where the boundary may extend beyond the confines of the magnetizable medium. An example of a suitable reading head is shown in FIGURE 8*a*, this figure showing a permeable core 110*a* having a reading winding 131 and positioned so that its gap 118*a* spans the magnetizable record medium 120*a*. As is clearly brought out in the above mentioned application Serial No. 132,732, the net flux in the pick-up head 110*a* is closely proportional to the elemental areas of C and D scanned by the gap 118*a* and hence to the displacement of the region of transition or boundary on the medium 120*a*.

As further described in the above mentioned patent the magnetic record thus inscribed may be made visible by immersing it in a suspension of some finely divided magnetic material in a volatile fluid such as a suspension of carbonyl iron powder in alcohol. The iron powder does not adhere to the entire surface but only to the remaining portions of bands 126 (or other areas as in FIGURES 6*a* and 6*b*) which represent the intense transverse field continuities that cross the non-magnetic spaces between the laminations of the pole structure 114.

In accordance with the discussion above in connection with FIGURES 1–4, it is to be noted that the recording head of FIGURE 5 is preferably direction. That is, the record medium is preferably drawn across the gap 118 from pole structure 114 toward pole structure 116. If the direction of the tape movement is reversed, the longitudinally recorded signal will be partially erased by the strong transverse field established by the perpendicularly laminated pole structure 114.

FIGURES 9–12 exhibit various views of another embodiment of a boundary displacement recording transducer head which has been successfully operated. This design is not only more compact but has the desirable feature of providing separate sources of bias flux and signal flux. (Elements identical with or analogous to those shown in the head of FIGURES 5–8 are here denoted by a similar reference character in the 200's.) In this modification, a bias field is derived from the transverse M.M.F. drop across a series of stacked laminae 214 whose plane is parallel to the direction of motion of the tape, or (not shown) across a pole piece of homogeneous high reluctance material. The source of bias flux is a permanent magnet 222 coupled to the ends of the stack 214 by highly permeable yokes 230.

A gap 218 is formed by one edge of the lamination stack 214 in conjunction with the mating edge of a homogeneously permeable signal flux member 116 (preferably of relatively low reluctance), whose section is in the form of a trapezoid open on one side. An unused gap 219 is also preferably provided. Because of the uniform reluctance of the gaps separating the signal flux member 216 from the lamination stack 214, the member 216 adopts a magnetic potential midway between the potentials at the extremes of stack 214.

One advantage of the structure of FIGURES 9–12 is that it is adaptable to either contact or non-contact recording, in that the method of assembly of the head permits adjustment of the recording gap to adapt to either use. For contact recording, a minimum gap is desired, and best high-frequency performance is achieved simply by butting the member 216 against stack 214, yielding a gap of a few ten-thousandths of an inch.

For non-contact recording, a space of .001 inch or more must be maintained between the gap 218 and the medium 220; in this case, a non-magnetic shim of .003 to .005 inch thickness may be inserted in the gap 218 without serious loss of high-frequency response. A relatively large gap in this case considerably relieves the burden on the bias magnet 222 in producing an over-saturating bias field in the medium.

Both the structures of FIGURES 5 and 9 have an advantage over previous types of boundary-displacement heads, for non-contact recording: heretofore a large current was required to compel signal flux to cross the gap in sufficient magnitude. Now, with the FIGURE 5 type, a somewhat lower reluctance signal path is provided, and with the FIGURE 9 type, there is achieved a very low-reluctance signal path and a high-reluctance bias path. The FIGURE 5 head in particular responds satisfactorily to a greatly reduced signal current.

Other advantages also accrue to the FIGURE 9 type of transducer. One is that the push-pull type of signal input required for the head of FIGURE 5 is not needed for the structure of FIGURE 9. On the contrary, the signal coil 224 may be driven by an ordinary transformer or vacuum tube. In FIGURE 5, it will be noticed that the signal flux is compelled, just as is the bias flux, to thread the laminae of pole-piece 114 in a direction normal to their plane, thereby encountering relatively high reluctance. In the device of FIGURES 9–12, it can be seen that the bias flux threads the high-reluctance path, but the signal flux meets comparatively little reluctance, since it travels in the plane of each lamina, rather than normal thereto. Thus the bias flux and the signal flux are orthogonally directed, with respect to each other.

The FIGURE 9 device is more easily constructed for high-fidelity purposes. It offers a better visible record and uses a permanent magnet as a source of bias flux, thereby avoiding the copper losses incident to the usual energized winding.

Factors causing the flux distribution and reversal in the transducer of FIGURE 9 will be apparent from the structure, and from the analog diagram in FIGURE 15. That is, leakage from the stack will proceed in one direction at one end of gap 218, and will proceed in the opposite direction at the other end, with a reversal point midway between when no signal current flows through coil 214. When a signal current is applied an additional flux, uniform over the length of the gap, will cause the boundary to shift in relation to the signal strength.

A still further embodiment of the invention is shown in FIGURE 13. A stack 314 of laminae has attached at either end highly permeable yokes 330 between which is placed a permanent bias magnet 322 (which could be an electric coil), the general arrangement being somewhat as in the embodiment of FIGURES 9–12. In the present embodiment the second pole structure here designated 316 (corresponding to the pole structure 216, FIGURES 9–12) is so arranged that gap 318 is formed, with the recording medium here designated 320 passed through the gap. The unused gap is designated 319.

In operation flux threading the laminated stack of pole structure 314 will fringe as aforesaid and will tend to produce transverse recordings in narrow bands or tracks along the recording medium 320. This action is substantially as in the previously described embodiments. However, the leakage flux to the pole structure 216 will produce so-called "thickness" recording, rather than surface recording as in the previously described embodiments, the resulting boundary recording being entirely satisfactory. The final boundary-displacement record will consist of thickness recording in one direction to one side of the boundary, thickness recording in the opposite direction to the other side of the boundary and portions of transverse recording in the boundary, as shown in FIGURE 8. The only difference in representation of the thickness recording would be that in FIGURE 8 the symbols C and D would pertain to magnetization going into the page at C and out of the page at D, or vice-versa.

The intelligence signal may be applied to the transducer of FIGURE 13 through coil 324, corresponding to coil 224 of FIGURE 5.

Apart from the difficulty of threading a tape through the gap 118 the embodiment of FIGURE 5 can be used to accomplish thickness recording in the same manner.

The difference in the reluctance paths which the flux must take in each head is shown in FIGURES 14, 15 and 16.

In connection with all of the foregoing embodiments of transducer heads, sample specifications for the major parts of the heads will now be set forth, but without limitation thereto, inasmuch as many other suitable combinations of dimensions and the like will occur to those skilled in the art.

Considering first the laminated type high reluctance pole pieces, to insure linearity of the bias field, it is preferable that the total transverse flux into the lamination stack be large compared to the active or intelligence flux across the recording gap. Also, the transverse reluctance of the perpendicularly stacked pole pieces should be sufficiently high so that the stack may absorb a major part of the magnetomotive force established thereacross.

The gaps between the respective pole structures, and the distance of separation between the permeable laminae should be as uniform as possible to maintain linearity between the recording current and the boundary-displacement.

A combination of specifications which has given excellent results is as follows:

(a) thickness of each permeable lamina (silicon steel), 0.015 inch
(b) thickness of each lamination spacer (brass), 0.003 inch
(c) gap width, 0.001 to 0.005 inch
(d) bias magnetomotive force (across stacked pole pieces), 200 ampere-turns
(e) peak signal magnetomotive force, 100 ampere-turns
(f) gap-to-tape spacing, 0 to 0.002 inch.

The above specifications, when employed with magnetizable tape 0.0007 to 0.005 inch thick, will provide a maximum boundary-displacement of plus or minus 0.125 inch for a lamination stack of 0.25 inch.

For homogeneous poles, the following data is exemplary:

(a) type of homogeneous material: compressed powdered iron, permeability 25.
(b) cross-section area required in homogeneous pole-piece: 1 sq. cm.
(c) gap width: .0002 inch.

(*d*) bias magnetomotive force across the homogeneous pole-piece: 20 ampere-turns.
(*e*) peak signal magnetmotive force: 10 ampere-turns.
(*f*) gap-to-tape spacing: contact.

It may be desirable to record more than variable boundary on a tape and for such purpuose I further provide the embodiment shown in FIGRES 17–19. In this case the high reluctance pole piece, which may be laminated or homogeneous, is arranged to cooperate with a plurality of discrete signal flux members such as the member 216 of FIGURES 9–12. Referring to FIGURES 17–19, the high reluctance pole piece is designated generally as 414 and is characterized by an elongated tip **414*a*. For purposes which will become clear below, a plurality of low reluctance signal flux members 416 are positioned to form a plurality of recording gaps 418 and unused gaps 419, each one being of the arrangement in the embodiment of FIGURES 9–12. Referring particularly to FIGURES 18 and 19, the complete transducer is made up of the plurality of transducers with the bias magnets 422 arranged to be magnetically additive. That is, the north to south orientation is the same. Members of low reluctance 428 may be employed to divide the pole piece 414 between the members 416, to prevent flux from fringing from one member 416** to the next.

The arrangement of the plurality of low reluctance signal flux members 416 is shown best in FIGURE 18. From this view it is clear that a multiple boundary recording is produced by the use of the transducer of FIGURES 17–19, the recording being shown in FIGURE 20 where the respective buondaries are designated 420, 422, 424 and 426. Each represents a different type of signal, since each of the members 416 may be independently excited.

Figure 21:
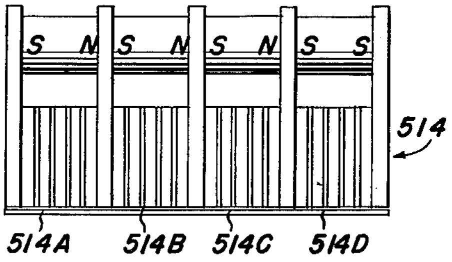
Figure 22:
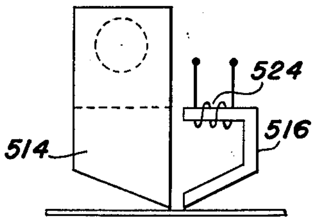
Figure 23:
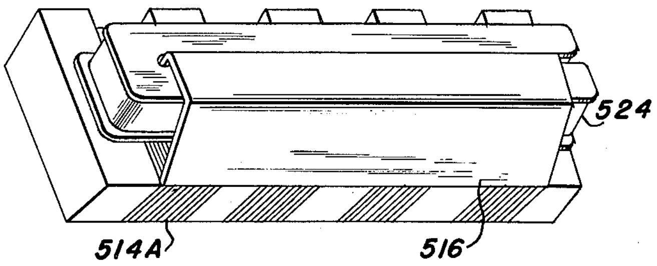

A still further embodiment of structure utilizing the basic principles of my invention is shown in FIGURES 21–24, this being an arrangement for simultaneously producing a plurality of boundaries under the excitation of a single signal. In this instance, in effect a plurality of single units as shown in FIGURES 9–12 are stacked end on end, with the bias M.M.F. source alternating in polarity. That is, reading left to right in FIGURE 21, the left-hand bias source reads south to north, then next north to south and so forth. The high reluctance pole piece is here designated 514 generally and consists of the discrete elements **514*a*, 514*b*, 514*c* and 514*d*. Referring to FIGURES 21 and 22, the signal flux member 516 in this case is similar in cross-section to the embodiment of FIGURES 9–12, but is elongated as best shown in FIGURE 23 to extend across each of the discrete high reluctance pole pieces 514*a–d*. One coil 524 is wound completely about the elongated pole piece 516. The bias M.M.F. arranged as exaplained above will produce a flux distribution across the recording gap 518 as shown in FIGURE 24 and the resulting recording will be as in FIGURE 25 where the respective boundaries are designated 520, 522, 524, 526**.

In the interest of clarity and to again emphasize the scope of the invention, it will be understood that in each case where the use of a laminated high reluctance pole piece is employed, a homogeneous pole piece of relatively high reluctance material may be used instead. However, the laminated type structure has the added advantages of providing the discrete flux path useful in making improved visible recordings, and also the signal flux path will be of low reluctance, since it is in the planes of the lamina and not perpendicular thereto.

From the foregoing it will be clear that there is provided by the present invention improved methods and apparatus for carrying out boundary recording. Since many additional embodiments of the invention will occur to others upon reading this specification, it is intended that all matter contained in the above description or shown in the accompanying drawings shall be interpreted as illustrative and not in a limiting sense. The true scope of the invention is to be determined from the appended claims.

What is claimed is:

1. Magnetic recording apparatus comprising means for establishing in recording relation to the surface a flux tending to induce a pattern of discrete areas of retained magnetization on the surface, and means for establishing in recording relation to the surface additional flux tending to induce major flux areas on the surface differing in orientation to either side of a boundary region, the additional flux acting in combined effect with the first mentioned flux areas to cause discrete flux areas to be recorded only in said boundary region.

2. Magnetic recording apparatus for recording on a relatively moving magnetizable surface, the apparatus comprising means for establishing in recording relation to the surface a flux tending to induce a pattern of discrete areas of retained magnetization on the surface, and means for establishing in recording relation to the surface additional flux tending to induce major flux areas on the surface differing in orientation to either side of a boundary region, the additional flux serving to obliterate the first mentioned flux areas except in said boundary region.

3. Magnetic recording apparatus comprising a first pole structure and a second pole structure each having portions spaced apart to form a recording gap having a length dimension for placement transverse to the direction of travel of a magnetizable record member, means to move said record member past the gap in operative relationship thereto, means whereby the first pole structure acts to present a predetermined magnetic reluctance to flux established by a magnetomotive force applied across said first pole structure in the gap length direction, means for applying a magnetomotive force across said first pole structure in said gap length direction, and means whereby the second pole structure acts to present a reluctance in the gap length direction lower than that of said first pole structure, the arrangement being such that flux established by said magnetomotive force links across the gap in one direction from the first pole structure to the second pole structure toward one end of the gap and the flux returns to the first pole structure in a direction opposite to said one direction toward the other end of the gap, thereby providing a reversal of linking flux intermediate the ends of the gap.

4. Apparatus as in claim 3 in which the first pole structure is constructed of homogeneous magnetic material to provide said means whereby the first pole structure acts to present a predetermined magnetic reluctance to flux established by a magnetic force applied across said first pole structure.

5. Apparatus as in claim 3 wherein the first pole structure is constructed of a stack of laminae, the axis of the stack extending in the direction of the recording gap and the planes of the laminae being substantially perpendicular to the plane of the record medium, to provide said means whereby the first pole structure acts to present a predetermined magnetic reluctance to flux established by a magnetomotive force applied across said first pole structure.

6. Apparatus as in claim 3 and further including signal coil means wound about said second pole structure.

7. Apparatus as in claim 3 wherein two or more discrete relatively low reluctance pole structures cooperate with a single higher reluctance pole structure, each lower reluctance pole structure having thereon a discrete signal coil.

8. Magnetic recording apparatus as in claim 3 wherein the first pole structure is constructed of a stack of laminae, the axis of the stack extending in the direction of the recording gap and the planes of the laminae being substantially perpendicular to the plane of the record medium, and wherein the means for applying a magnetomotive force across said first pole structure in the gap length direction includes means to establish said magnetomotive force across said laminated stack.

9. Apparatus as in claim 8 wherein the means for establishing magnetic flux through the laminated stack of the first pole structure comprises electric coil means.

10. Apparatus as in claim 8 wherein the means for establishing magnetic flux through the laminated stack of the first pole structure comprises permanent magnet means.

11. Apparatus as in claim 8 wherein said second pole structure terminates at one end at said gap defining portion and terminates at its other end in close proximity to the laminae of the first pole structure to form a second gap having substantially the configuration of the recording gap.

12. Apparatus as in claim 8 wherein said second pole structure terminates at one end at said gap defining portion and terminates at its other end in close proximity to the laminae of the first pole structure to form a second gap having substantially the configuration of the recording gap, and wherein a signal coil is wound about the second pole structure.

13. Apparatus as in claim 8 wherein a magnetic core interconnects the first and second pole structures, the core having first and second portions and an energizing coil wound about each portion.

14. Apparatus as in claim 13 wherein a magnetic core interconnects the first and second pole structures, the core having first and second portions and an energizing coil wound about each portion, the core and second pole structure consisting of an undivided mass of magnetic material.

15. Apparatus as in claim 13 wherein a magnetic core interconnects the first and second pole structures, the core having first and second portions and an energizing coil wound about each portion, the core and second pole structure consisting of an undivided mass of magnetic material comprising laminae lying at right angles to the laminae of the first pole structure.

16. Apparatus for recording on a magnetizable surface movable with respect thereto, the apparatus comprising a first pole structure and a second pole structure, a portion of each pole structure being located in close proximity to the other to define between the portions a recording gap to be positioned in operative relation to the magnetizable surface, the first pole structure being of laminated construction, the laminae thereof being in planes perpendicular to the surface and stacked in a direction transverse to the direction of movement of the surface, means for establishing a magnetomotive drop across the laminated stack in said direction of the stack, and means including the second pole structure for establishing magnetizing flux across the said gap in varying amount from one end of the gap to the other.

17. Apparatus for recording on a magnetizable surface movable with respect thereto, the apparatus comprising a first pole structure and a second pole structure, a portion of each pole structure being located in close proximity to the other to define between the portions a recording gap to be positioned in operative relation to the magnetizable surface, the first pole structure being of laminated construction, the laminae thereof being in planes perpendicular to the surface and stacked in a direction transverse to the direction of movement of the surface, means for establishing magnetic flux through the laminated stack in said direction of the stack, and means including the second pole structure for establishing other magnetizing flux across the said gap in varying amount from one end of the gap to the other.

18. Apparatus for recording on a magnetizable surface movable with respect thereto, the apparatus comprising a first pole structure and a second pole structure, a portion of each pole structure being located in close proximity to the other to define between the portions a recording gap to be positioned in operative relation to the magnetizable surface, the first pole structure being of laminated construction, the laminae thereof being in planes perpendicular to the surface and stacked in a direction transverse to the direction of movement of the surface, the second pole structure being homogeneous at least in the direction of the plane of the surface, means for establishing magnetic flux through the laminated stack in said direction of the stack, and means including the second pole structure for establishing other magnetizing flux across the said gap in varying amount from one end of the gap to the other.

19. Apparatus for recording on a magnetizable surface movable in a predetermined direction with respect thereto comprising a first pole structure and a second pole structure, a portion of each pole structure being located in close proximity to the other to define between said portions a recording gap, the first pole structure consisting of a stack of laminae of magnetic material having non-magnetic spacers therebetween, means for mounting the said first pole structure in a position relative to the magnetizable surface to place the laminae in planes which are perpendicular to the surface and parallel to the direction of movement of the surface, means for applying a magnetomotive force across the first pole structure from one end laminae to the opposite end laminae, and coil means associated with the second pole structure for establishing in said second pole structure a flux to be varied in accordance with a signal to be recorded, said flux tending to bridge the recording gap.

20. Apparatus as in claim 19 wherein a magnetic core having a first loop and a second loop connects the second pole structure with the end laminae of the first pole structure and wherein the coil means comprises two separate coils, one wound about each of said loops of the core.

21. Apparatus as in claim 19 wherein the second pole structure extends from said one portion defining the recording gap to a second portion spaced from the laminated stack at a second portion of the stack to define a second gap substantially of the configuration of the recording gap, and wherein a coil means is wound about the second pole structure for establishing a signal flux through said second pole structure.

22. Apparatus as in claim 19 and including means for directing the magnetizable surface past the same side of the first and second pole structures to provide surface recording.

23. Apparatus as in claim 19 and including means for directing the magnetizable surface between the opposed portions of the first and second pole structures defining said recording gap to provide thickness recording.

24. In a variable area magnetic recording head for producing on a longitudinally moving elongated magnetizable recording medium a permanent magnetic record of an electrical signal in which the height of said record transversely of said medium varies in correspondence with variations of the instantaneous amplitude of said signal, the combination of: an electromagnet for producing a magnetomotive force corresponding to said signal; a magnetic pole structure of substantial length disposed transversely of said recording medium with one surface in contact with said medium, said pole structure having a relatively high reluctance from end to end and comprising a plurality of thin separate magnetic members disposed in side by side relation with their thickness dimension parallel to the length of said structure, said magnetic members being held in spaced relation to each other by non-magnetic spacer members interposed between adjacent magnetic members; and magnetic conductor means of low reluctance connected between one end of said electromagnet and one end of said pole structure to magnetize said end of said pole structure in accordance with said magnetomotive force produced by said electromagnet, each of said magnetic members being magnetized in an amount dependent upon the magnetomotive force produced by said electromagnet and the distance of said magnetic member from said one end of said pole structure, whereby said recording medium is magnetized along the length of said pole structure to a varying degree dependent upon the amplitude of said signal and the distance from said one end of said pole structure.

25. In a variable area magnetic recording head for producing on a longitudinally moving elongated magnetizable recording medium a permanent magnetic record of an electrical signal in which the height of said record transversely of said medium varies in correspondence with variations of the instantaneous amplitude of said signal, the combination of: an electromagnet for producing a magnetomotive force corresponding to said signal; a magnetic pole structure of substantial length disposed transversely of said recording medium with one surface in contact with said medium, said pole structure having a relatively high reluctance from end to end and comprising a plurality of thin separate magnetic members disposed in side by side relation with their thickness dimension parallel to the length of said structure, said magnetic members being held in spaced relation to each other by non-magnetic spacer members interposed between adjacent magnetic members, said magnetic members being of equal thickness and said non-magnetic members being of equal thickness and holding said magnetic members in uniform spaced relation; and magnetic conductor means of low reluctance connected between one end of said electromagnet and one end of said pole structure to magnetize said end of said pole structure in accordance with said magnetomotive force produced by said electromagnet, whereby said recording medium is magnetized along the length of said pole structure to a varying degree dependent upon the amplitude of said signal and the distance from said one end of said pole structure.

26. Apparatus for magnetic oscillography comprising, in combination: a magnetic recording head having an elongated recording gap, a premagnetized record medium, means for moving said premagnetized record medium through a flux field bridging said recording gap and away therefrom at a given angle, means producing magnetic flux in said head which flows across said recording gap in opposite directions at opposite ends of the gap and leaves a magnetically neutral region in the gap between the ends of the gap, means for shifting the magnetically neutral region lengthwise along the gap in response to the signal to be recorded while the record medium is moving across the recording gap and thence away from the head at said angle to record in the medium an invisible latent magnetic image of the combined recorded signal and of the premagnetization which establishes magnetic forces external to the record medium only along said latent image, and magnetizable particles connected to the surface of the record medium substantially only at the location of said external magnetic forces to form a trace.

References Cited in the file of this patent

UNITED STATES PATENTS

| | | |
|---|---|---|
| 699,630 | Pedersen | May 6, 1902 |
| 1,011,322 | Clement | Dec. 12, 1911 |
| 2,594,414 | Garreau | Apr. 29, 1952 |
| 2,632,061 | Begun | Mar. 17, 1953 |
| 2,743,320 | Daniels et al. | Apr. 24, 1956 |
| 2,806,904 | Atkinson et al. | Sept. 17, 1957 |
| 2,822,427 | Atkinson et al. | Feb. 4, 1958 |